United States Patent
Desthieux et al.

(10) Patent No.: US 6,175,445 B1
(45) Date of Patent: Jan. 16, 2001

(54) OPTICAL FIBER FOR A FLAT-GAIN OPTICAL AMPLIFIER

(75) Inventors: Bertrand Desthieux, Paris; Laurent Gasca, Orsay; Christian Le Sergent, Marcoussis; Christophe Sinet, Fontenay aux Roses, all of (FR)

(73) Assignee: Alcatel, Paris (FR)

( * ) Notice: Under 35 U.S.C. 154(b), the term of this patent shall be extended for 0 days.

(21) Appl. No.: 09/305,659

(22) Filed: May 5, 1999

(30) Foreign Application Priority Data

May 14, 1998 (FR) .................................................. 98 06082

(51) Int. Cl.[7] ........................................................ H01S 3/00
(52) U.S. Cl. .......................... 359/341; 359/337; 385/126; 385/127; 372/6
(58) Field of Search ...................................... 359/337, 341; 385/123, 126, 127, 128; 501/95, 100; 372/6

(56) References Cited

U.S. PATENT DOCUMENTS

| | | | |
|---|---|---|---|
| 5,491,581 | * | 2/1996 | Roba ..................................... 359/341 |
| 5,742,722 | * | 4/1998 | Imoto ................................... 385/126 |
| 5,970,198 | * | 10/1999 | Inagaki et al. ......................... 385/127 |

FOREIGN PATENT DOCUMENTS

| | | |
|---|---|---|
| 0 490 881 A2 | 6/1992 | (EP) . |
| 0 565 439 A1 | 10/1993 | (EP) . |
| 0 654 872 A1 | 5/1995 | (EP) . |
| 2 740 561 A1 | 4/1997 | (FR) . |

OTHER PUBLICATIONS

Desthieux B. M., et al: "Spectral bandwidth broadening for long–haul submarine WDM applications using phosphorus–aluminum–codoped EDFAs" Electronics Letters, vol. 32, No. 24, Nov. 21, 1996, pp. 2214–2216, XP000683711.

* cited by examiner

Primary Examiner—Nelson Moskowitz
(74) Attorney, Agent, or Firm—Sughrue, Mion, Zinn, Macpeak & Seas, PLLC

(57) ABSTRACT

The invention relates to an optical fiber having a core based on silica with at least one fluorescent dopant distributed over the entire section of the core, a central zone co-doped with a co-dopant chosen from Al and P, and a peripheral zone co-doped with the other co-dopant chosen from Al and P. The invention can be used in an optical fiber amplifier, and it guarantees good amplifier gain flatness over a wavelength band suitable for WDM transmission.

15 Claims, 3 Drawing Sheets

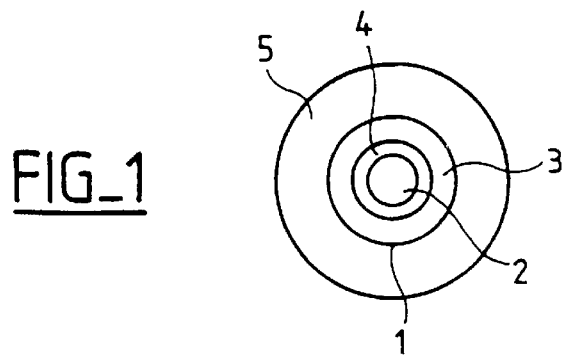
FIG_1
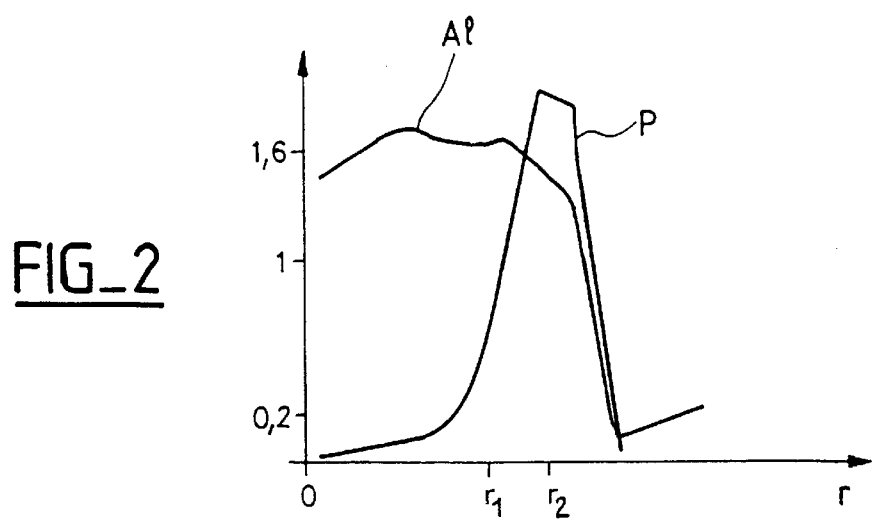
FIG_2
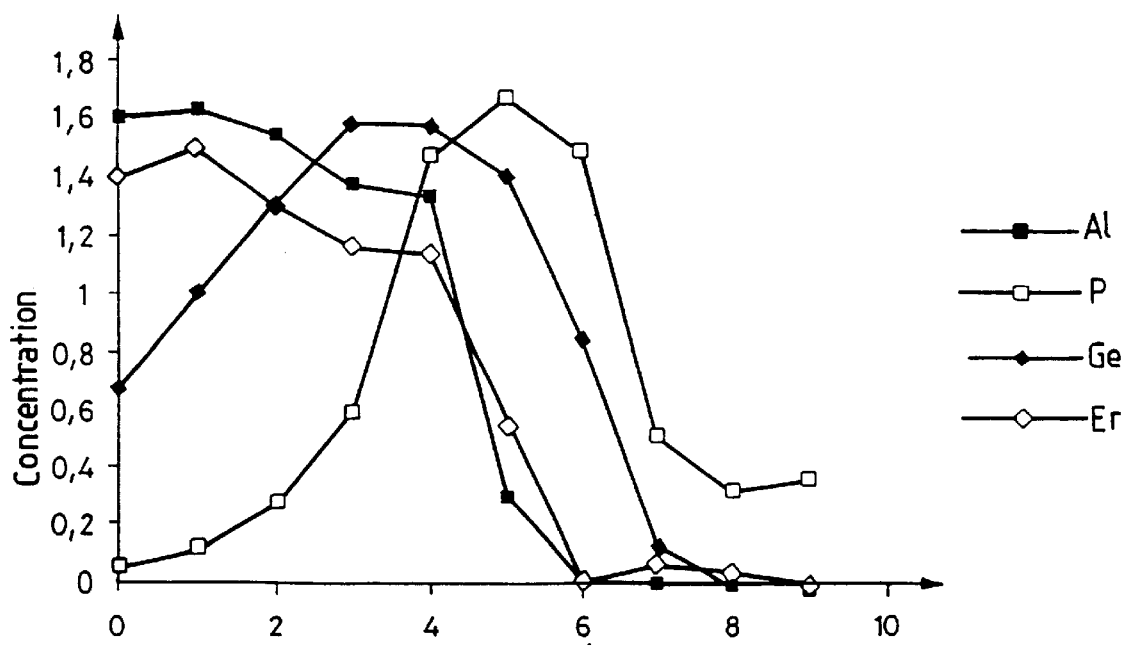
FIG_3

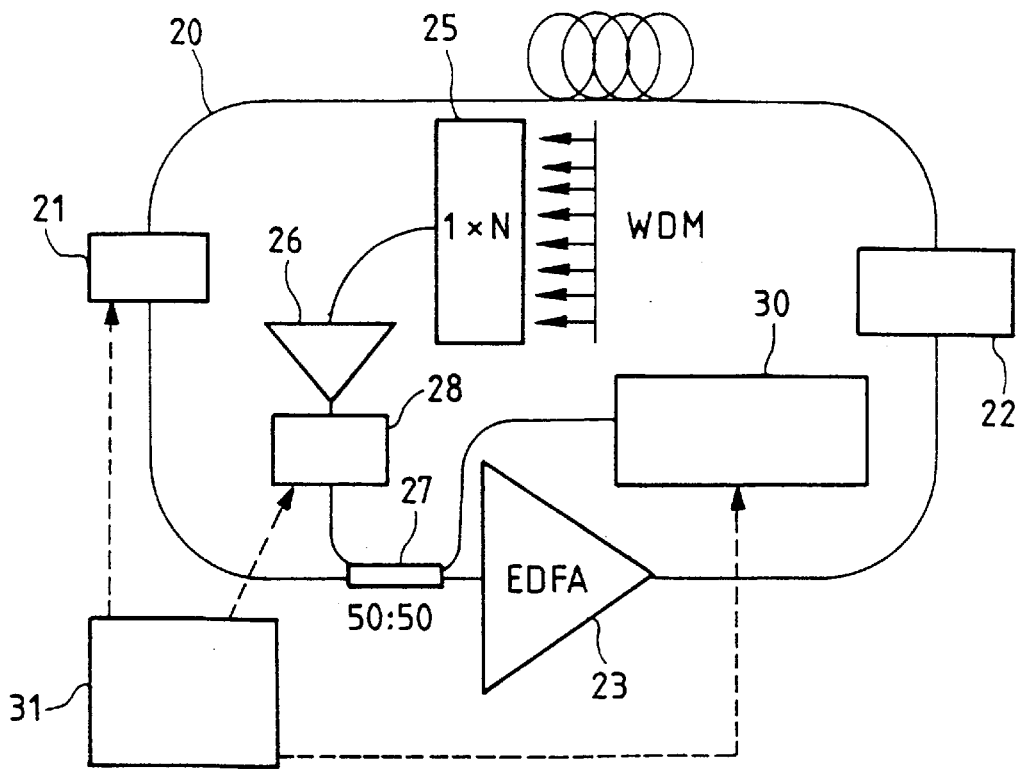
FIG_4
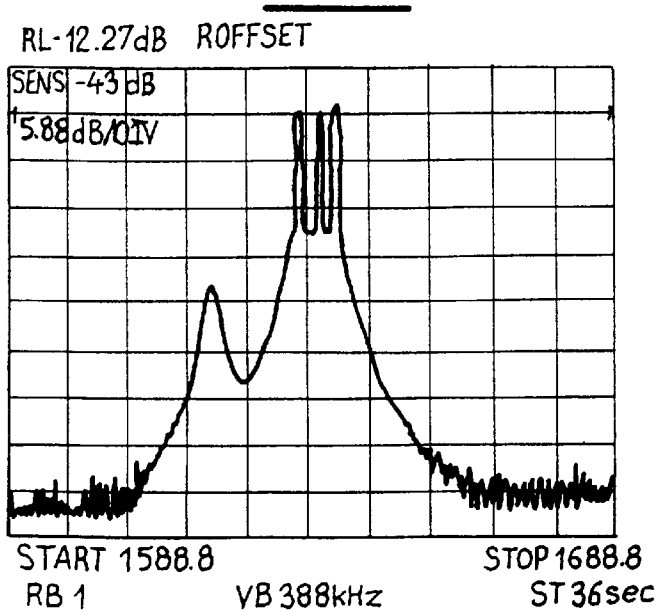
FIG_5

FIG_6
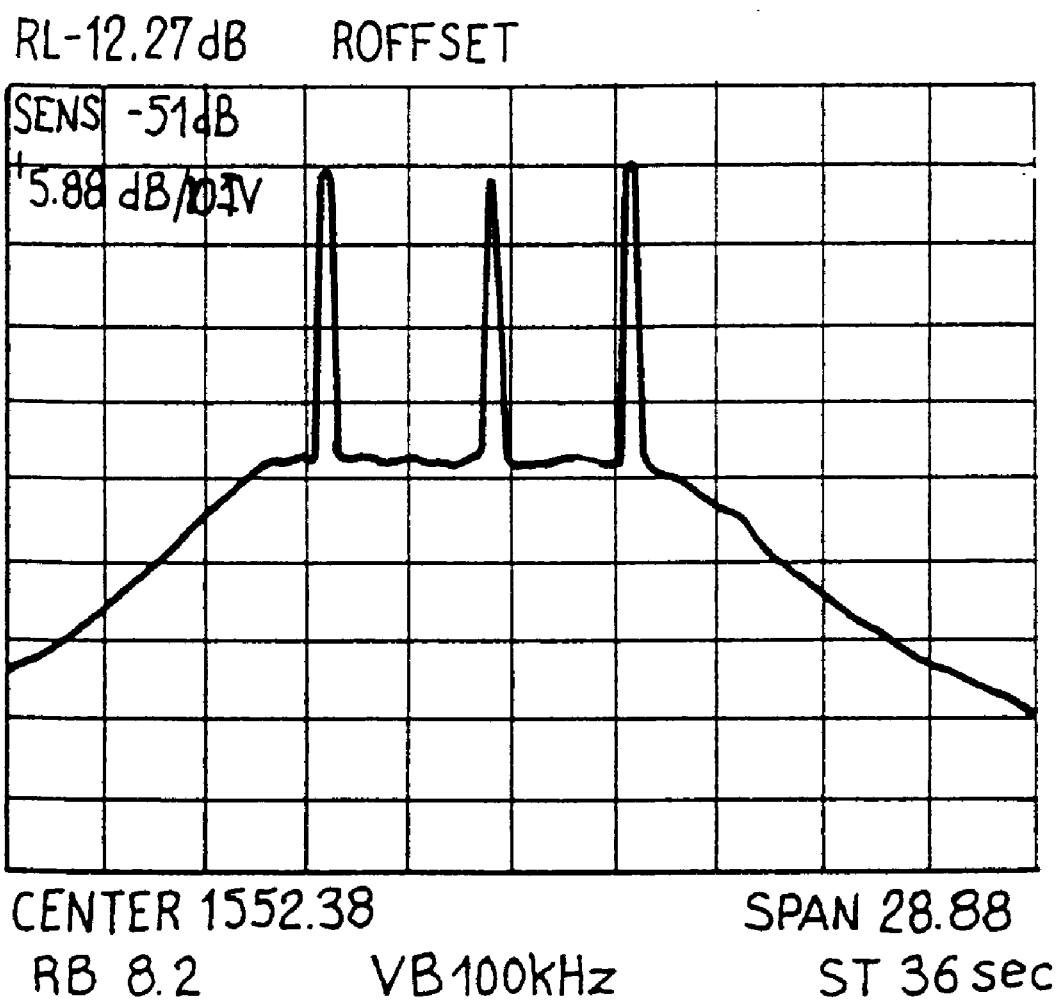

OPTICAL FIBER FOR A FLAT-GAIN OPTICAL AMPLIFIER

The present invention relates to an optical fiber containing at least one fluorescent dopant, and to a method of manufacturing such a fiber. In particular, the present invention relates to an optical fiber having a fluorescent dopant for a flat-gain optical amplifier, and to an amplifier including such a fiber.

BACKGROUND OF THE INVENTION

Such an optical fiber is, in particular, suitable for making amplifiers for transoceanic transmission systems using wavelength division multiplexing (WDM). Optical fiber transmission systems, and in particular transoceanic systems, use amplification devices at regular intervals, each amplification device being formed by a fiber doped with a rare earth such as erbium, and by a pump. In the specific case of WDM transmission, the amplification devices should have a bandwidth at least equal to that of the multiplex, and a gain peak as flat as possible centered on the band of the multiplex.

These characteristics may be obtained by adding filters, e.g. Bragg gratings, as described in O. Gautheron, P. Sansonnetti, G. Bassier, and I Riant, "Optical gain equalisation with short period fiber gratings", ECOC'97, pages 131–134, 1997, or else in N. Bergano et al., "100 Gb/s WDM transmission of twenty 5 Gb/s NRZ data channels over transoceanic distances using a gain flattened amplifier chain", ECOC'95, pages 967–970, 1995. It would however be advantageous to obtain these characteristics by means of the amplification fiber itself.

To that end, proposals have already been made to associate two different fiber sections mounted one after the other in the amplifier. C. R. Giles and D. DiGiovanni, "Dynamic Equalization in Two-Stage Amplifiers", OAA'90, MD2, p. 48–51, proposes to correct the relative gain variations between the channels of a wavelength division multiplex by means of a two-stage amplifier, in which the two stages have complementary gain spectra. That document proposes a first stage formed by an erbium-doped fiber having a germano-alumino-silicate core, and a second stage formed by an erbium-doped fiber having an alumino-silicate core. By pumping the two fibers separately, it is possible to equalize the gain over the range of the multiplex.

T. Kashiwada et al., "Gain-flattened optical-fiber amplifiers with a hybrid Er-doped-fiber configuration for WDM transmission", OFC'95 Technical Digest, TuP1, pp. 77–78, proposes an erbium-doped fiber amplifier formed by a section of fiber co-doped with aluminum (1.4% by weight) cascaded with a section of fiber co-doped with aluminum and with phosphorus (5% by weight of P and 1% by weight of Al). That document proposes using a single pump, but equalizing the gain by an appropriate choice of fiber section lengths.

M. Kakui et al., "Low noise, high power optical amplifiers employing an improved hybrid Er-doped fiber configuration for WDM transmission", OAA'96, Technical Digest, SaA3, pp. 203–206 proposes a two-stage amplifier; the first stage is formed of an erbium-doped fiber co-doped with aluminum; the second stage is formed of an erbium-doped fiber section co-doped with aluminum and with phosphorus and cascaded with an erbium-doped fiber section co-doped with aluminum. Each section is pumped separately, and the choice of the relative lengths of the fibers makes it possible to select the input power level for which gain equalization is maximized.

M. Kakui et al., "Design Optimization of Hybrid Erbium-Doped Fiber Amplifiers for WDM Transmission Systems", Optical Fiber Technology 3 (1997), pp. 123–133, proposes cascading an erbium-doped fiber co-doped with aluminum and an erbium-doped fiber section co-doped with phosphorus and with aluminum; in the same way, the relative lengths of the fiber sections make it possible to equalize the gain.

P. F. Wysocki and D. DiGiovanni, "Dual-Stage Erbium-Doped, Erbium/Ytterbium Codoped Fiber Amplifier with up to +26 dBm Output and 17 nm Flat Spectrum", OAA'96, Technical Digest 1996, SaA2, proposes an amplifier with a first fiber section doped with erbium and co-doped with aluminum, and a second fiber section doped with erbium and with ytterbium, and co-doped with phosphorus. The two sections are pumped independently, and the gain is equalized by appropriately choosing respective lengths for the two sections.

P. Nilson et al., "Simple gain-flattened erbium-doped fiber amplifier with a wide dynamic range", OFC'97 Technical Digest, pp. 129–130, proposes a first fiber section doped with erbium and co-doped with phosphorus, and a second fiber section doped with erbium and co-doped with aluminum and with germanium. The resulting amplifier presents gain flatness over a dynamic range of 15 dB by means of an appropriate choice of the co-dopants and of the fiber lengths.

Those solutions suffer from the drawback of increasing the cost of the amplifiers because of the existence of various components and because of the need to assemble together various fiber sections, usually together with an isolator.

Proposals have also been made to use co-dopants such as aluminum and phosphorus in the same fiber. B. J. Ainslie et al., "Erbium doped fibers for efficient optical amplifiers", IEE Proceedings, vol. 137, Pt. J. No. 4, August 1990, describes using an erbium-doped $Al_2O_3$—$P_2O_5$—$SiO_2$ fiber for optical amplifiers. That document makes no mention of the gain equalization problem, and suggests no solution to this problem.

B. M. Desthieux et al, "Enhanced spectral gain-response of in-line amplifiers for transoceanic WDM systems using phosphorus aluminum codoped EDFAs", OAA'96 Technical Digest, SaA4-1, pp. 207–210, compares an erbium-doped and $P_2O_5$—$Al_2O_3$ co-doped fiber with $Al_2O_3$—$GeO_2$ co-doped fiber. That document makes no mention of the proportions of the co-dopants or of the positioning of the dopants in the fiber.

EP-A-0 602 467 describes an erbium-doped fiber for a fiber amplifier. The aim pursued in that document is to increase the numerical aperture of the fiber; for that purpose, it is proposed to dope the fiber core with $Al_2O_3$, $GeO_2$ or $P_2O_5$; it is also proposed to provide a stress-reducing layer between the fiber core and the cladding, so as to reduce the differences between the coefficients of thermal expansion. That layer may be doped with $P_2O_5$ and $F_2$. It is also possible to provide a barrier layer between the fiber core and the stress-reducing layer, so as to limit the diffusion of phosphorus into the core. That also limits the diffusion of erbium into the stress-reducing layer.

FR-A-2 740 563 proposes a silica optical fiber whose core comprises a central zone containing erbium, aluminum, and optionally germanium, a low-doped or non-doped intermediate zone, and a peripheral zone doped with germanium or with phosphorus. The low-doped or non-doped intermediate zone acts as a barrier against the diffusion of erbium into the peripheral zone.

Those various documents do not provide any solution to the problem of equalizing gain in erbium-doped fiber amplifiers for WDM transmission systems.

A. Bjarklev, "Hybrid Erbium-Doped Fiber for Gain Flattened Operation", Optical Fiber Technology 3 (1997), pp. 72–76, proposes an optical fiber whose erbium-doped core (of radius $r_2=a=1.625$ m) comprises a central zone (of radius $r_1=0.5$ a) co-doped with Al and a peripheral zone co-doped with Ge, together with a second optical fiber which is similar but in which the zones in which the co-dopants are placed are reversed relative to the first fiber (and with a radius $r_1=0.65$ a). That article emphasizes how difficult it is to manufacture erbium-doped fibers having two different co-dopants, because of the micro-structures in which the erbium ions are incorporated during fiber manufacture.

D. J. Di Giovanni et al., "Structure and properties of silica containing aluminum and phosphorus near the $AlPO_4$ join", J. of Non-Crystalline Solids 113, pp. 58–64, 1989, explains that mixing Al and P in a silica matrix causes $AlPO_4$ to be formed, which has the effect of decreasing the refractive index of the fiber. That article suggests associating Al and P so as to obtain glasses having new properties.

OBJECTS AND SUMMARY OF THE INVENTION

An object of the invention is to propose an optical fiber making it possible to obtain gain equalization over a wavelength range also corresponding to the gain peak. Another object of the invention is to propose an optical fiber that has low background noise, and acceptable output power, and that is easy to use in a fiber optical amplifier, in particular for amplifying WDM signals.

It also offers suitable amplification over the wavelength range.

More precisely, the invention provides an optical fiber having a core based on silica with at least one fluorescent dopant distributed over the entire section of the core, a central zone co-doped with a co-dopant chosen from Al and P, and a peripheral zone co-doped with the other co-dopant chosen from Al and P.

In an embodiment, the fluorescent dopant is erbium.

In another embodiment, the co-dopant of the central zone is Al. It is also possible to make provision for the co-dopant of the central zone to be P.

Advantageously, the proportion of Al in the fiber core lies in the range 1% by weight to 5% by weight; the proportion of P in the fiber core preferably lies in the range 1% by weight to 5% by weight.

In an embodiment, the proportions of P and of Al in the fiber are substantially equal.

Preferably, the fiber has a barrier layer between the central zone and the peripheral zone. Preferably, the barrier layer is substantially not doped or is only lightly doped.

In an embodiment, at least one core zone is co-doped with an index-increasing dopant such as Ge. The proportion of Ge in the fiber core preferably lies in the range 10% by weight to 25% by weight.

The invention also provides the use of modified chemical vapor deposition to manufacture such an optical fiber.

Finally, the invention provides an optical fiber amplifier comprising such a fiber according to any one of the claims, and optical pumping means.

BRIEF DESCRIPTION OF THE DRAWINGS

Other characteristics and advantages of the invention will appear on reading the following description of embodiments of the invention, given by way of example and with reference to the accompanying drawings, in which:

FIG. 1 is a cross-section view of an optical fiber of the invention;

FIG. 2 shows how the co-dopants are distributed in a first embodiment of an optical fiber of the invention, as a function of radius;

FIG. 3 shows how the co-dopants are distributed in a second embodiment of an optical fiber of the invention, as a function of radius;

FIG. 4 shows a circular loop used as a circuit for testing a fiber of the invention;

FIG. 5 shows the spectrum response of an optical fiber of the invention; and

FIG. 6 shows the spectrum response of an optical fiber of the invention on a larger scale.

MORE DETAILED DESCRIPTION

The invention proposes an optical fiber that offers good gain equalization in a wavelength range corresponding to a wavelength division multiplex. For this purpose, the invention proposes to dope the core of the fiber with a fluorescent dopant, such as erbium, and to co-dope the fiber with Al and with P; the fiber is co-doped with these two elements in zones of the fiber that are distinct at least in part, e.g. in the central zone of the fiber core, and in the peripheral zone of the fiber core.

FIG. 1 is a cross-section view of an optical fiber of the invention, showing the core 1 of the fiber and the cladding 5 of the fiber. The fiber is a silica fiber whose core is doped, substantially in its entirety, with a fluorescent dopant such as erbium; it is also possible to select some other fluorescent dopant or to add one or more additional fluorescent dopants to erbium. The proportion of erbium in the core of the fiber is chosen to lie in the range 50 ppm to 1000 ppm, so as to guarantee good pumping effectiveness.

The cladding 5 of the fiber may be made up conventionally of silica layers doped with germanium, phosphorus, and fluorine at less than 1% by weight; other cladding compositions known per se are possible.

In the central zone 2, the core of the fiber is co-doped with a co-dopant chosen from aluminum and phosphorus. The proportion of co-dopant in the central zone of the core of the fiber advantageously lies approximately in the range 1% by weight to 5% by weight. In the peripheral zone 3, the core of the fiber is co-doped with a co-dopant chosen from aluminum and phosphorus. The proportion of co-dopant in the peripheral zone of the core of the fiber advantageously lies approximately in the range 1% by weight to 5% by weight. Preferably, the proportions of aluminum and of phosphorus in the core of the fiber are substantially equal. It is possible to co-dope the central zone of the core of the fiber with aluminum and to co-dope the peripheral zone with phosphorus, as shown in FIG. 2, or else to co-dope the central zone of the fiber core with phosphorus, and the peripheral zone with aluminum.

The term "central zone" of the core of the fiber is used to mean the core zone that extends in the vicinity of the axis of the fiber. The term "peripheral zone" of the core of the fiber is used to mean the fiber core zone that lies in the vicinity of the cladding, i.e. that is radially outermost in the optical fiber.

The central zone and the peripheral zone may overlap in part, as explained with reference to FIG. 2. It is possible, as explained below, to provide a barrier zone or barrier layer 4 between the central zone and the peripheral zone.

FIG. 2 is a graph showing how the co-dopants are distributed in an optical fiber of the invention as a function of radius. Radius is plotted along the x-axis in arbitrary units, and the local concentration of the various dopants in percentage by weight is plotted up the y-axis. As shown in FIG. 2, the central zone of the fiber (for radii less than $r_1$) mainly contains aluminum; in the peripheral zone (for radii greater than $r_2$) the fiber essentially contains phosphorus. In the zone between $r_1$ and $r_2$, the fiber contains phosphorus, aluminum, and also $AlPO_4$. Typically, $r_2=1.4\times r_1$. The fiber contains erbium over substantially all of its cross-section. In the embodiment shown in FIG. 2, the zone co-doped with phosphorus and the zone co-doped with aluminum overlap in part.

The formation of $AlPO_4$ between the peripheral zone and the central zone, or at the border between these two zones, can lead to a decrease in the refractive index of the fiber core. In an embodiment, the invention proposes to provide additional doping with an index-increasing dopant at least in the central zone of the fiber core, so as to increase the refractive index of the core. It is possible to use germanium in a concentration approximately in the range 10% by weight to 25% by weight, and preferably about 15% by weight.

FIG. 3 shows, with the same conventions as FIG. 2, the distribution of the dopants when the entire fiber is doped with germanium. In FIG. 3, radius in arbitrary units is plotted along the x-axis, and dopant concentration in arbitrary units is plotted up the y-axis. To make the graph clearer, the units of concentration differ from one element to another. In FIG. 3, it can also be observed that there is a central zone essentially co-doped with aluminum, and a peripheral zone essentially doped with phosphorus. In the embodiment of the invention shown in FIG. 3, a barrier layer is provided between the central zone and the peripheral zone so as to limit the diffusion of Al into the zone co-doped with P. For example, the barrier layer may be formed merely by a layer of silica that is substantially not doped with Al and P or that is only lightly doped therewith; it may also be formed by a layer of silica merely co-doped with Ge insofar as the fiber is also doped with Ge. The barrier layer is thick enough to limit diffusion of Al, e.g. the section of the barrier layer represents about one third of the total section of the core.

FIG. 4 is a diagram showing a circular loop used as a circuit for testing a fiber of the invention. In the circuit shown in FIG. 4, a line fiber coil 20, used as a time delay, with a switch 21 and an attenuator 22, is connected to the terminals of an optical fiber amplifier 23 whose amplification fiber is a fiber of the invention. The WDM signal delivered by a source 25 is amplified by an amplifier 26 and coupled to the line fiber by a 50:50 coupler 27; a switch 28 makes it possible to isolate the amplifier 26 from the coupler. The other end of the fiber of the coupler is connected to a spectrum analyzer 30. The switches and the spectrum analyzer are controlled by a driver 31.

In the circuit shown in FIG. 4, the amplifier comprises a fiber that is 28 m long, with reverse pumping at 1.48 mm. The losses at the input and at the output of the amplifier were respectively 1 dB and 2 dB. The losses from the loop were 15.8 dB. Three signals at 1548.7 nm, 1552.0 nm, and 1554.6 nm with a total input power of −7.5 dBm were injected into the erbium doped fiber which was pumped with 27 mW at 1480 nm, and the spectrum response curves shown in FIGS. 5 and 6 were obtained. These curves correspond to output after a total budget of 1100 dB, i.e. a path length equivalent to 5500 km, and they cover respective bandwidth ranges of 100 nm and 20 nm. It can be observed that there is no difference between the three channels and the gain plateau coincides with the gain peak.

A method of manufacturing a fiber of the invention is described below. The optical fiber may be obtained by modified chemical vapor deposition (MCVD). This solution guarantees good results in terms of background losses, of refractive index differences, and of reproducibility of amplification characteristics. The fiber is manufactured using the MCVD technique which is known per se. For example, the following numbers of passes may be made:

peripheral zone of the core: 2 passes $SiCl_4+POCl_3+GeCl_4$;

barrier zone: 2 passes $SiCl_4+GeCl_4$; and central zone of the core: 1 pass $SiCl_4+GeCl_4$, this pass being under-vitrified so that it is possible to incorporate aluminum and erbium by means of the solution soaking technique.

In this embodiment of the fiber, the central zone of the core is doped with phosphorus, and the erbium used as a fluorescent dopant is added at the same time as the aluminum during manufacture of the central zone. The erbium diffuses into the central zone of the fiber core so as to have a concentration profile of the type shown in FIG. 3, and so as to spread substantially over the entire core of the fiber. Conversely, as shown in FIG. 3, the concentration of phosphorus in the central zone is low.

Naturally, the present invention is not limited to the embodiments described and shown, but rather numerous variants of it accessible to the person skilled in the art are possible.

What is claimed is:

1. An optical fiber having a core which is adapted to transmit an optical signal, and which is based on silica with at least one fluorescent dopant distributed over the entire cross-section of the core, a central zone of the core being co-doped with one co-dopant chosen from Al and P, and a peripheral zone of the core being co-doped with the other co-dopant chosen from Al and P.

2. An optical fiber according to claim 1, wherein the at least one fluorescent dopant is erbium.

3. An optical fiber according to claim 1, wherein the co-dopant of the central zone is Al.

4. An optical fiber according to claim 1, wherein the co-dopant of the central zone is P.

5. An optical fiber according to claim 1, wherein the proportion of Al in the fiber core lies in the range 1% by weight to 5% by weight.

6. An optical fiber according to claim 1, wherein the proportion of P in the fiber core lies in the range 1% by weight to 5% by weight.

7. An optical fiber according to claim 1, wherein the proportions of P and of Al in the fiber are substantially equal.

8. An optical fiber according to claim 1, having a barrier layer between the central zone and the peripheral zone.

9. An optical fiber according to claim 8, wherein the barrier layer is substantially not doped or is only lightly doped.

10. An optical fiber according to claim 1, wherein at least one of the central zone and the peripheral zone is co-doped with an index-increasing dopant such as Ge.

11. An optical fiber according to claim 10, wherein the proportion of Ge in the fiber core lies in the range 10% by weight to 25% by weight.

12. The use of modified chemical vapor deposition to manufacture an optical fiber according to claim 1.

13. An optical fiber amplifier comprising a fiber according to claim 1, and optical pumping means.

14. The optical fiber according to claim 1, wherein said central zone is co-doped with only said first co-dopant, and said peripheral zone is co-doped with only said other co-dopant.

15. The optical fiber according to claim 14, further comprising a cladding surrounding said core.

* * * * *